G. O. GRIDLEY.
SCREW THREADING MECHANISM.
APPLICATION FILED JULY 14, 1909
1,130,398.
Patented Mar. 2, 1915.
4 SHEETS—SHEET 3.
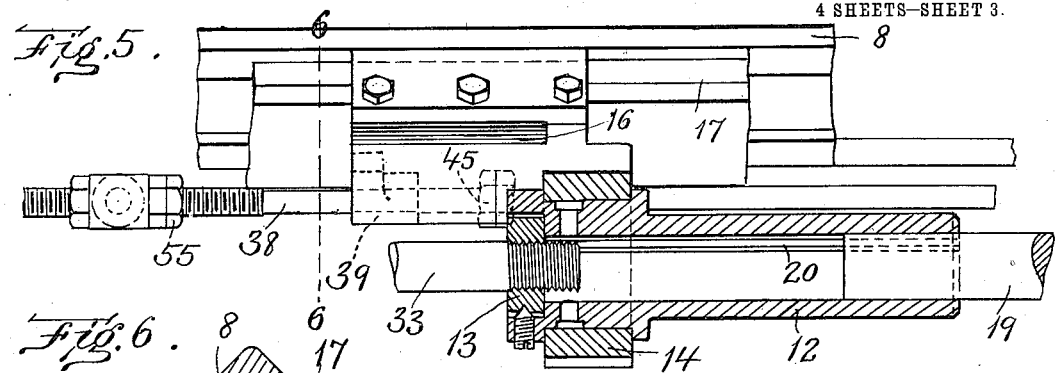
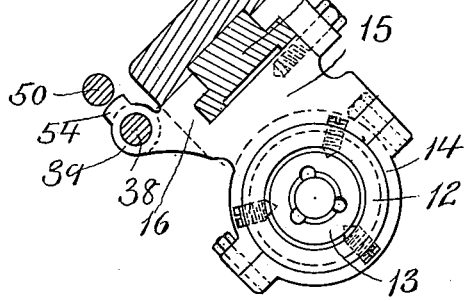
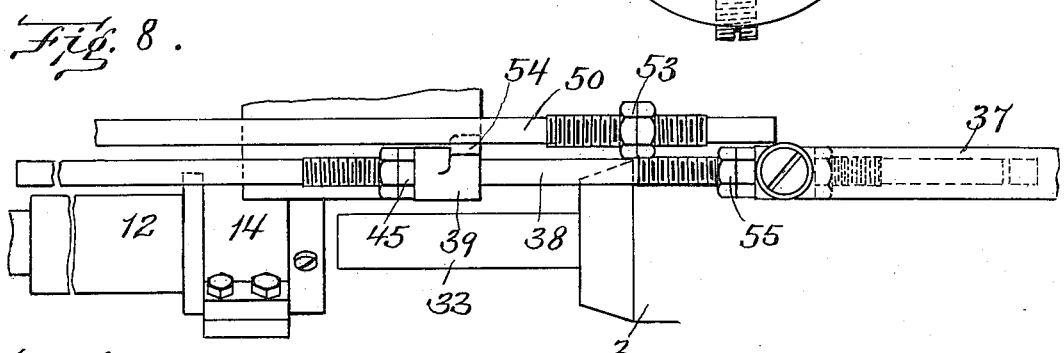
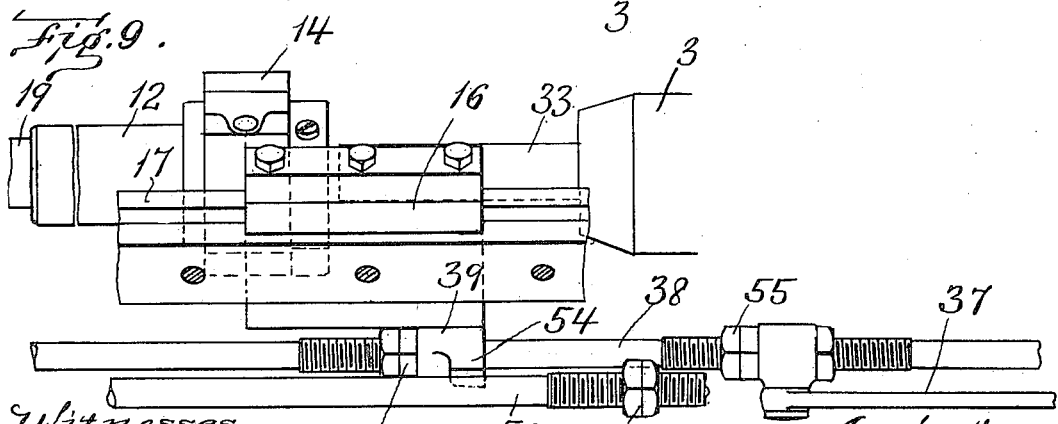
Witnesses.
Inventor.
G. O. Gridley
By Wright Brown Quinby & May
Attys

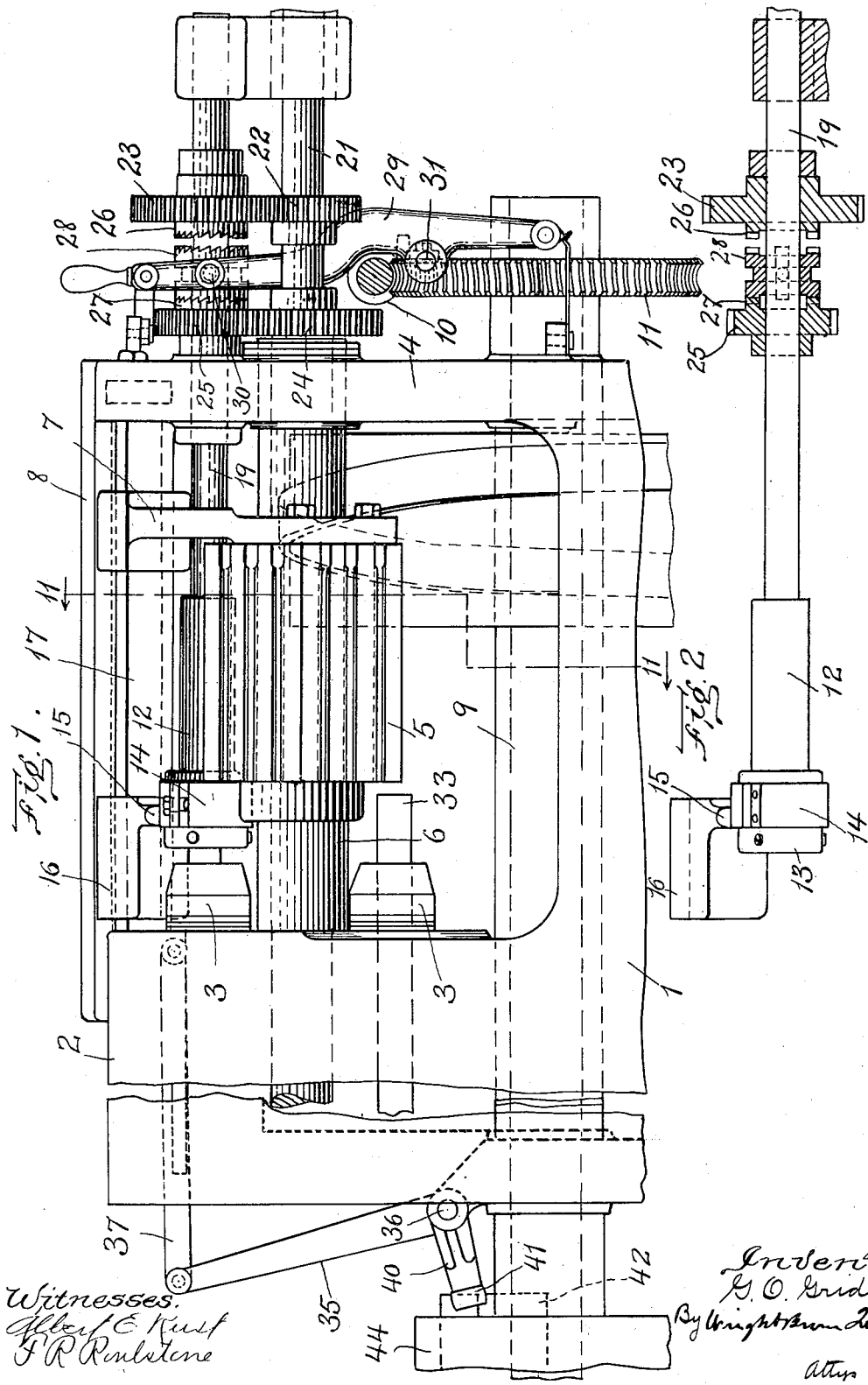

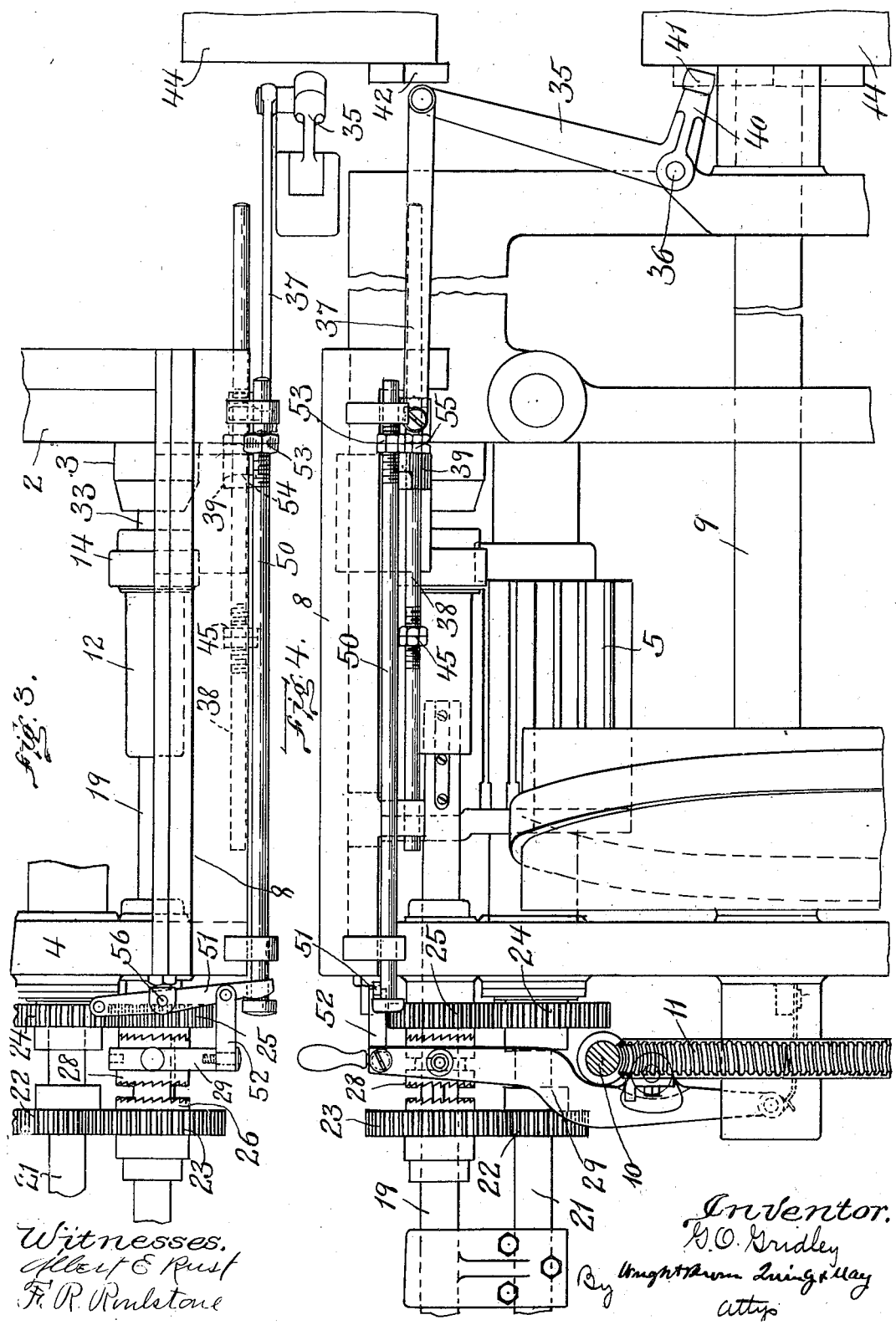

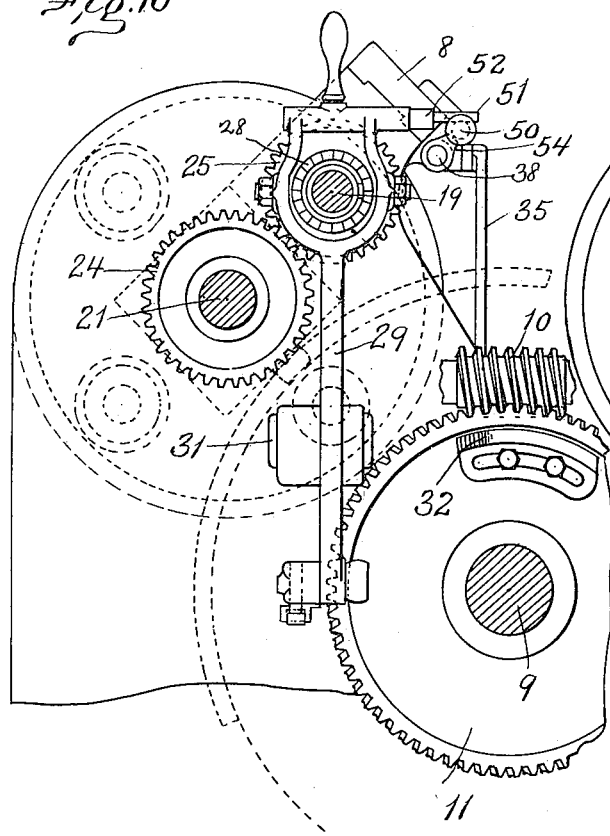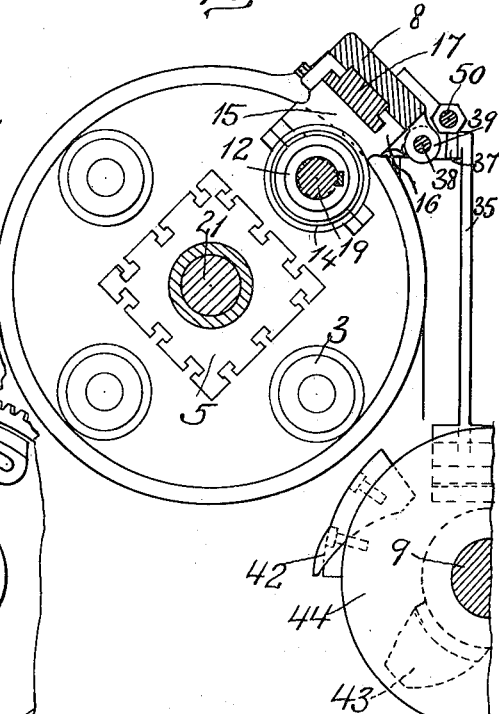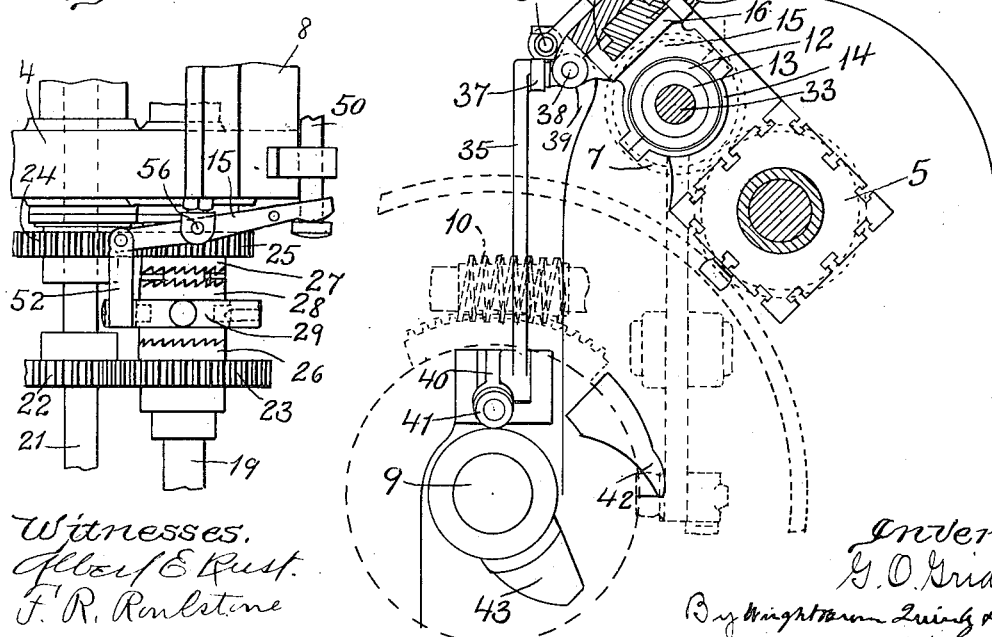

UNITED STATES PATENT OFFICE.

GEORGE O. GRIDLEY, OF WINDSOR, VERMONT.

SCREW-THREADING MECHANISM.

1,130,398.   Specification of Letters Patent.   Patented Mar. 2, 1915.

Application filed July 14, 1909. Serial No. 507,511.

*To all whom it may concern:*

Be it known that I, GEORGE O. GRIDLEY, of Windsor, in the county of Windsor and State of Vermont, have invented certain new and useful Improvements in Screw-Threading Mechanisms, of which the following is a specification.

This invention relates to mechanisms for automatically cutting screw-threads upon or within a rotating work piece, and is of a character adapted to be used with multi-spindle metal working machines of a type such as that illustrated in my prior Patent No. 904,866, granted November 24, 1908. In screw-threading mechanisms of this character, the work is carried by a rotating work spindle, and a die, tap or other threading tool is brought into engagement with the work. The threading tool is also rotated in the same direction as the work and alternately at a plurality of speeds, one of which speeds is greater than that of the work, while the other is less, thus enabling the tool to be first threaded upon or into the work, and then after the change of speed is made, to be unthreaded therefrom.

One of the objects of my invention is to provide an improved threading mechanism of this character, by means of which the speed of rotation of the plural-speed member of the mechanism may be changed either from the lower to the higher speed or from the higher to the lower speed upon conclusion of the thread-cutting relative travel of the work and threading tool, so that either right-hand or left-hand threads may be cut on the work without reversing the direction of rotation of the work or of the tool. The mechanism may thus be adapted for cutting threads of either right-hand or left-hand inclination, by simply changing the chasers or tap of the threading tool, and by making a simple change or reversal in a portion of the mechanism which effects the change in speed of the variable-speed member of the mechanism.

Another object of the invention is to arrange a screw-threading attachment in a multi-spindle machine of the character above referred to in such manner that the threading tool is mounted independently of the tool slide by which the other metal-working tools are carried, and is thus enabled to perform its movements of advance or retraction entirely independent of such slide, and regardless of whether the slide is at the same time undergoing an advance or a retraction.

Still another object is to provide an improvement in the means for bringing the threading tool up to the work and in the clutch-shifting mechanism for changing the speeds of rotation of the threading tool in the threading attachment of a multi-spindle machine, such as that illustrated in Patent No. 904,866, hereinbefore referred to.

The means by which I accomplish the above-noted objects are illustrated in the accompanying drawings and explained in detail in the following specification.

In the drawings I have illustrated one possible embodiment of means for accomplishing the objects above outlined, together with enough of a multi-spindle machine of the character shown in the Patent No. 904,866 to illustrate one manner in which the same may be applied and operated.

In the drawings,—Figure 1 represents in front elevation, part of a multi-spindle machine of the character above referred to, showing the manner of application of my present improvements thereto. Fig. 2 is a detail view of the threading tool and the means for operating it, adapted to be employed in connection with the above machine. Fig. 3 is a plan view of the improved screw-threading mechanism forming a part of the present invention. Fig. 4 is a rear elevation of so much of a machine as is illustrated in Fig. 1. Fig. 5 is a sectional view of a threading tool showing in elevation the means for supporting the same. Fig. 6 is a cross section on line 6—6 of Fig. 5. Fig. 7 is an end elevation of a threading die adapted to be employed as the threading tool in a machine of this character. Fig. 8 is an elevation, showing in detail the relation between the die and work and the mechanism for advancing the die to the work and for changing the speed of the die. Fig. 9 is a plan view of the same parts which are shown in Fig. 8. Fig. 10 is an end elevation as seen from the right of Fig. 1, of the parts shown in said figure. Fig. 11 is a cross section on line 11—11 of Fig. 1, looking in the direction of the arrow. Fig. 12 is an end elevation, partially in section, of the machine as seen from the left of Fig. 1. Fig. 13 is a detail view, showing the manner of connecting the speed-changing mechanism of the threading tool for cutting left-hand threads when the work and threading tool are driven in right-hand rotation.

The same reference characters indicate the same parts in all the figures.

So much of the present machine as is common to that illustrated in my Patent No. 904,866, needs no detailed description.

1 represents the frame of the machine, having a standard 2 in which is a turret carrying the work spindles 3, and having also a standard 4.

5 is the tool slide movable upon a guide 6 and having a steadying arm 7 which is guided by a bar 8 attached at its ends to the standards 3 and 4. The steadying arm and guide bar are new, and form part of the present invention.

9 is the cam shaft which is driven by the worm and wheel gearing 10 11, and carries the cams by which the movements of the various mechanisms are imparted.

Whenever the turret is made stationary, one of the spindles is in line with a threading tool, consisting of a sleeve 12 carrying a die 13 or a tap or threading tool of any other suitable character. This sleeve is journaled in a bearing 14 carried by an arm 15 which projects from a slide 16 mounted upon a guide 17 which is secured by bolts or otherwise to the bar 8 before mentioned. By reference to Figs. 11 and 12, it will be noted that the guide 17 has flanges at its edges, which are embraced by the lips 18 of the slide 16, so that the latter is supported by the guide. Thus the threading tool which is journaled in the bearing 14 of the slide is supported independently of the slide 5 by the guide bar 17 and is enabled to have its longitudinal movements on the latter quite independent of the movements of said slide.

The means for rotating the threading tool consists of a shaft 19 which extends into the sleeve 12, as shown in Fig. 5, and has a splined connection at 20 therewith, permitting longitudinal movement of the sleeve relatively to the shaft, but causing the latter to impart rotation thereto. The shaft 19 is caused to rotate at either of two different speeds from the main drive shaft 21, by two trains of gears represented respectively by 22 23 and 24 25. The gears 23 and 25 are loosely mounted on the shaft 19 and carry clutch elements 26 and 27 respectively, with which a double clutch 28 mounted between them is adapted to make independent connection. This clutch is splined to the shaft and is movable endwise thereon so as to connect with either of the clutch elements 26 or 27. The value of the gear train 22 23 is such that the shaft 19, and therefore the threading tool, is rotated by the gear train, when connected therewith, at a speed less than that of the work spindles, and is restrained by the clutches 26, 28, when engaged with the work, from being rotated by the work at the speed of the latter, while the train 24 25 is adapted to rotate the die more rapidly than the work spindles. A clutch-shifting lever 29 has a forked arm embracing the clutch 28 and engaged therewith by studs 30 entering a groove in the clutch. Said lever is pivoted at 31 and is operated by a cam 32 on the worm wheel 11. The cam 32 may be made so as to swing the lever 29 in either direction, to connect the clutch 28 with either of the loose driving gears 23 25, whereby the die may be driven either faster or slower than the work.

For cutting right-hand threads the work spindle and the bar or other piece of work 33 carried thereby are rotated clockwise, and the threading tool is rotated in the same direction, but at a less speed. This has the effect of giving the die a relatively left-hand movement with respect to the work, and causes it to be threaded upon the work. When the clutch is shifted so as to disconnect the slow-speed driver 23 and connect the high-speed driver 27 with the die, the latter is driven more rapidly than the work and is unthreaded therefrom.

In order to commence the action of the die upon the stock, the former must be moved longitudinally until its cutting edges engage the stock. This movement is accomplished by mechanism substantially such as here shown, consisting of a lever 35 pivoted at 36 and connected through a link 37 with a bar 38 which passes through a lug 39 on the slide 16, by which the die is supported. This lever has an arm 40 provided with a roll 41 adapted to be engaged by cams 42 and 43 carried by a drum 44 on the cam shaft 9. The cam 42 swings the upper arm of the lever outward, or to the right, as shown in Fig. 4 (to the left with respect to Fig. 1), and draws the rod 38 to the right until an adjustable abutment 45 thereon strikes the lug 39 and moves the die also to the right. This abutment conveniently consists of a pair of nuts adjustably threaded upon the rod so that their location may be changed in order to give the die sufficient travel to engage work pieces of various lengths without imparting enough movement to injure the die. As soon as the work has rotated a slight amount relatively to the die, the latter cuts into the same and is automatically drawn along by the threads which it cuts, until it is backed off upon being driven at the higher speed.

The mechanism by which the threading tool in its travel causes its own speed of rotation to be altered, consists conveniently of a rod 50 connected by a rocker 51 pivoted between its ends upon a pivot 56, and intermediate link or bar 52, with the clutch-shifting lever 29. This rod carries an adjustable abutment 53, conveniently a pair of lock nuts, which are located in the path of a lug 54, carried by the slide 16. When the latter and the die have advanced a predetermined distance along the work, determined by the position of the abutment 53, the lug 54 strikes such abutment and moves the rod 50 endwise into the position shown in Figs. 3 and 4, thereby disengaging the clutch from the low-speed driver 23, and connecting it with the high-speed driver 25. The threading tool is then rotated faster than the work and is caused by its engagement with the threads previously cut to be backed off from the work. When clear of the work the lever 35 is thrown back by the cam 43 and brings an adjustable abutment 55 against the lug 39, pushing the threading tool away clear of the work.

In the foregoing description of operation it has been assumed that the work and threading tool are driven in right-hand rotation and that a right-hand thread is to be cut. Left-hand threads could be cut by reversing the direction of rotation of the work and tool and substituting a left-hand die or tap for the right-hand one previously used, the speed of the die while cutting being less than that of the work. The same result may also be accomplished without reversing the direction of drive, by means forming part of the clutch-shifting mechanism. This means consists of the rocker 51 previously described. This rocker has means on each side of its pivot or fulcrum for connection of the link or bar 52 therewith. Fig. 13 shows the link or bar 52 connected with the rocker on the opposite side of its pivot from that shown in Fig. 3. When thus connected, if the rod 50 is moved to the right, as before described, the clutch shifter is moved to the left, carrying the clutch out of connection with the high-speed driver and into connection with the low-speed driver. The form of connection shown in Fig. 13 enables left-hand threads to be cut, while the spindle and threading tool rotate clockwise, provided that a left-hand tap or die is substituted as the threading tool. In this case the cam 32 is made such as to connect the clutch with the high-speed driver 25 before the commencement of the threading operation. The threading tool then is driven faster than the work, with the same effect as though it were turned to the left relatively thereto, and is advanced upon the work, cutting a left-hand thread. Upon advancing a predetermined distance, the die causes the rod 50 to be moved as before and to shift the clutch, with this difference, that the clutch is shifted out of engagement with the high speed driver into connection with the low-speed driver so that the left-hand inclination of the threads of the cutter may cause the latter to be backed off from the work.

The shiftable connection between the actuator rod 50 and the clutch, consisting of the rocker 51 and bar 52, afford the most convenient means for adapting the machine to cut threads of either inclination, as this connection can be much more readily shifted than could the necessary gears or other connections be substituted for making the work spindle and die rotate in the reverse direction.

The manner of mounting the threading tool independently of the tool slide 5 is also of first importance in a machine of this character, as it leaves the threading tool free to have feed movements independent of the slide and permits the latter to be returned with a quick motion as soon as the operations of the tools carried thereby are completed. For instance, it usually happens that the threading is completed before the operations of the other tools are completed. If the die were advanced by the tool slide, it could not be retracted until the other operations would permit the slide to return, and the speed of return of the latter would be limited to the speed of unthreading of the die from the work. By having the die mounted separately from the tool slide, it is enabled to be freed from the work as soon as the predetermined length of thread has been cut, and then allows the tool slide to be returned, at a speed which is not limited by the unthreading of the die, as soon as the operations performed by the tools carried by the slide are completed.

I claim:—

1. In a multiple-spindle metal-working machine, the combination of a turret, a plurality of work-carrying spindles journaled in said turret, a tool slide movable toward and from said turret having a steadying arm, a bar parallel to the line of movement of said slide by which the arm is guided, a die, and a supporting guide secured to said bar on which said die is supported and along which it is enabled to move toward and from said turret independently of the slide.

2. In a multiple-spindle metal-working machine, the combination of a turret, a plurality of work-carrying spindles journaled in said turret, a tool slide movable toward and from said turret, a guide bar separate from said tool slide having flanges at its edges, and a threading tool holder having lips embracing the flanges of said guide bar and movable along the same toward and from the turret.

3. In a multiple-spindle metal-working machine, the combination of a turret, a plurality of work-carrying spindles journaled in said turret, a tool slide movable toward and from said turret and independent thereof, a guide bar parallel with said tool slide but independent thereof and of the turret, a slide mounted on said guide bar so as to hang therefrom and be independent of both the turret and tool slide and provided with a bearing, and a screw-threading tool journaled in said bearing and movable with said slide along the guide bar toward and from the turret.

4. A screw-threading mechanism, comprising a rotary work-holding spindle, a rotary threading tool, mechanisms for causing rotation of said tool at either of two speeds respectively greater and less than that of the spindle, and automatic means for making said mechanisms operative in alternation, said means having provision for causing said mechanisms to become operative in either of two sequences, whereby the machine is adapted for cutting either right or left-hand threads.

5. A screw-threading mechanism comprising a rotary work-holder, a rotary die, and automatic mechanism for causing the rotation of said die to take place at alternately faster and slower speeds than said work holder, including clutches, a clutch shifter, a lever, and a link connected to the clutch shifter, adapted to be joined with the lever on either side of the fulcrum, for changing the order in which the different speeds are given to the die.

6. A screw-threading mechanism, comprising, in combination, a rotating work spindle, a threading tool, driving mechanisms for causing said tool to be rotated at different speeds, respectively faster and slower than that of the spindle, an oppositely movable device for coupling the tool to either driving mechanism independently, an actuator for said device, and connections between the said device and actuator for transmitting motion to the former from the latter, having provision for such alterations in arrangement that movement of the actuator in one direction may move said device in either of two different directions.

7. A screw-threading mechanism comprising a work-holder, means for rotating said holder and the work carried thereby, a threading tool, driving mechanisms for said tool constructed to cause the latter to be rotated in the same direction as the work at speeds respectively slower and faster than that of the work, a speed-changing device for coupling the tool with either mechanism exclusively, and automatic means for actuating said device when the threading tool has advanced a sufficient distance along the work to uncouple the slower speed mechanism and couple the higher speed mechanism, said means including a shiftable member adapted to be so placed as to actuate said speed changing device in the opposite order.

8. A screw-threading mechanism comprising a rotatably driven work holder, a threading tool, driving gear trains for causing said tool to be rotated at speeds respectively greater and less than that of said work holder and in the same direction as the latter, a clutch for connecting either of said trains independently to said tool, and a clutch shifter for disengaging said clutch from one train and connecting it with the other when the threading tool has advanced a sufficient distance along the work, said shifter having changeable connections such that it may move the clutch in either of two opposite directions when moved itself in one direction.

9. A screw-threading mechanism comprising a rotatably driven work holder, a threading tool, driving elements separately and independently connectible with said threading tool for causing the same to be rotated at speeds respectively greater and less than that of said work holder, and means operated by the advance of the tool along the work for disconnecting one of said elements from the tool and connecting the other therewith, said means including a changeable connection whereby either of said elements may be connected when the tool is advanced.

10. In a metal-working machine, a rotating work spindle, a threading tool movable rotatably and axially, a plurality of drivers loose with respect to said tool, adapted to be connected therewith and to effect rotation of the same at speeds respectively greater and less than that of said spindle, a clutch movable oppositely to connect said drivers alternately with said tool, and a clutch shifter mounted beside said tool and movable longitudinally parallel thereto, said shifter being engaged and moved in the advance of the tool to shift said clutch out of connection with one of said drivers and into connection with the other.

11. In a metal-working machine, a rotating work spindle, a threading tool movable rotatably and axially, a plurality of drivers loose with respect to said tool, adapted to be connected therewith and to effect rotation of the same at speeds respectively greater and less than that of said spindle, a clutch movable oppositely to connect said drivers alternately with said tool, a clutch shifter mounted beside said tool and movable longitudinally parallel thereto, being engaged and moved by the tool in the advance of the latter, a rocker engaged with said shifter and a connection between said rocker and the clutch, adapted to be attached to the rocker at either side of the pivot thereof.

12. In a metal-working machine, a rotating work spindle, a threading tool movable rotatably and axially, a plurality of drivers loose with respect to said tool, adapted to be connected therewith and to produce rotation of the same at speeds respectively greater and less than that of said spindle, means for connecting said drivers independently with said tool, and a rod mounted beside said tool so as to be moved thereby to actuate said means to disconnect one of the drivers from, and connect the other with, the tool.

13. A screw-threading mechanism comprising a rotating work spindle, a threading tool movable axially toward said spindle to engage the work carrier thereby, and rotatably to form a thread in the work, a lever arranged to swing in the same direction as the axial movement of said tool, means for swinging said lever, a connection between said lever and tool whereby a swing of the former may bring the latter into contact with the work, a plurality of rotary drivers, a clutch for connecting said drivers separately with the tool to effect rotation of the same at speeds respectively greater and less than that of the work, whereby the tool after being engaged with the work may be threaded thereon and then backed off therefrom, a second lever for causing said clutch to connect one of said drivers with the tool, and a shifter connected with said clutch and operated by axial movement of the threading tool to effect disconnection of such driver and connection of the other with the tool.

14. A screw-threading mechanism comprising a rotating work spindle, a threading tool, a holder having a bearing in which said threading tool rotates and being movable along the axis of rotation of said tool, a lever having a connection with said holder, and mounted to swing in a direction such as to move said holder and tool into engagement with the work carried by said spindle, means for so swinging said lever, a shaft connected with said threading tool, a plurality of drivers loosely mounted on said shaft and rotatively driven at speeds respectively greater and less than that of said work spindle, a clutch splined to said shaft between said drivers and movable into connection with either independently, a cam-operated lever engaged with said clutch for moving the same into connection with one of said drivers for setting the tool into operation to cause it to be threaded on the work after being engaged therewith by the first lever, and a rod connected with said lever and operated by axial movement of the threading tool to connect said clutch with the other driver for backing the tool off from the work.

15. A screw-threading mechanism comprising a rotating work spindle, a threading tool, a holder having a bearing in which said threading tool rotates and being movable along the axis of rotation of said tool, a lever having a connection with said holder and mounted to swing in a direction such as to move said holder and tool into engagement with the work carried by said spindle, means for so swinging said lever, a shaft connected with said threading tool, a plurality of drivers loosely mounted on said shaft and rotatively driven at speeds respectively greater and less than. that of said work-spindle, clutching means independently operable to connect either of said drivers with said shaft, a cam-operated lever for actuating said means to clutch one of the drivers to the shaft, and a rod movable parallel with the axial movement of said tool and operated thereby to actuate said means to connect the other driver with the shaft and disconnect the first therefrom.

16. A screw-threading mechanism comprising a rotary work spindle, a rotary threading tool, a plurality of drivers normally disconnected from said tool for causing rotation of the same at speeds respectively greater and less than that of said spindle and in the same direction, whereby said tool may be first threaded on or in the work and then backed off therefrom, means independent of said tool for making connection between the latter and one of said drivers, and means operated by the tool upon advance thereof for disconnecting such driver and making connection with the other, said means including a changeable connection by which the order in which connection is made between the threading tool and the several drivers may be reversed.

17. A screw-threading mechanism comprising a rotary work spindle, a rotary threading tool, a plurality of drivers normally disconnected from said tool for causing rotation of the same at speeds respectively greater and less than that of said spindle and in the same direction, whereby said tool may be first threaded on or in the work and then backed off therefrom, a clutching device by which either of said drivers may be connected with said tool, an actuator operable by advance of the tool for shifting said clutching device to disconnect one of said drivers and connect the other with the tool, and a connection between said actuator and clutching device adapted to be changed so that movement of the actuator in one direction may move the clutching device in either of two opposite directions.

18. In a screw-threading machine having a rotary work spindle, a rotary threading tool, and mechanism for causing said tool to be rotated in the same direction with said work spindle at speeds respectively greater and less than the latter, means by which the speed of the tool may be changed when the tool has acted upon a predetermined extent of the work, to cause unthreading of the tool from the work, and a connection forming part of said means changeable to enable the speed change to be made from less to greater, or the reverse, whereby either right or left-hand threads may be cut while the direction of rotation of the spindle and tool remain the same.

19. In a screw-threading machine having a rotary work spindle and a rotary threading tool, one of said members being rotated alternately at speeds respectively greater and less than that of the other, and both rotating in the same direction, a speed-changing device for altering the speed of said variable speed member to cause unthreading of the tool from the work when a thread of sufficient length has been cut, said device being variable to enable the change of speed to be made from less to greater, or the reverse, whereby right-hand or left-hand threads may be cut.

In testimony whereof I have affixed my signature, in presence of two witnesses.

GEORGE O. GRIDLEY.

Witnesses:
 ARTHUR H. BROWN,
 P. W. PEZZETTI.